United States Patent
Wang et al.

(10) Patent No.: US 8,473,180 B2
(45) Date of Patent: Jun. 25, 2013

(54) ON-BOARD FUEL PROPERTY DETECTION USING PATTERN RECOGNITION AND POWER SPECTRAL ANALYSIS OF CYLINDER PRESSURE SIGNAL

(75) Inventors: Yue-Yun Wang, Troy, MI (US); Chol-Bum M. Kweon, Rochester, MI (US); Ibrahim Haskara, Macomb, MI (US); Frederic Anton Matekunas, Troy, MI (US); Donald Terry French, Warren, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 592 days.

(21) Appl. No.: 12/720,815

(22) Filed: Mar. 10, 2010

(65) Prior Publication Data

US 2011/0224886 A1    Sep. 15, 2011

(51) Int. Cl.
*F02D 41/30* (2006.01)
(52) U.S. Cl.
USPC ............... 701/103; 123/299; 123/435
(58) Field of Classification Search
USPC .................. 701/101–105, 111, 114; 123/435, 123/445, 478, 480, 486, 406.47, 406.55, 123/299
See application file for complete search history.

(56) References Cited

U.S. PATENT DOCUMENTS

| | | | |
|---|---|---|---|
| 5,633,798 A * | 5/1997 | Kopp | 701/111 |
| 7,421,884 B2 * | 9/2008 | Aoyama | 73/35.02 |
| 7,621,174 B2 * | 11/2009 | Takaku | 73/114.53 |
| 2004/0154591 A1 * | 8/2004 | Shinzawa | 123/406.47 |
| 2007/0079647 A1 * | 4/2007 | Aoyama | 73/35.02 |
| 2007/0089697 A1 * | 4/2007 | Hara et al. | 123/90.15 |
| 2007/0169748 A1 * | 7/2007 | Nakayama et al. | 123/435 |
| 2008/0262699 A1 * | 10/2008 | Hasegawa et al. | 701/103 |
| 2009/0299605 A1 | 12/2009 | Kweon et al. | |

FOREIGN PATENT DOCUMENTS

JP     09158819 A  *  6/1997

* cited by examiner

*Primary Examiner* — John Kwon
*Assistant Examiner* — Johnny Hoang

(57) ABSTRACT

Combustion pressure in a diesel combustion chamber is monitored to determine a combustion parameter as a function of the monitored pressure. A cetane number of the fuel combusted is determined as a function of a predetermined correlation between the combustion parameter and the cetane number.

15 Claims, 5 Drawing Sheets

ON-BOARD FUEL PROPERTY DETECTION USING PATTERN RECOGNITION AND POWER SPECTRAL ANALYSIS OF CYLINDER PRESSURE SIGNAL

TECHNICAL FIELD

This disclosure relates to operation and control of internal combustion engines, including compression-ignition engines.

BACKGROUND

The statements in this section merely provide background information related to the present disclosure and may not constitute prior art.

Combustion within an engine involves introducing fuel and air into a combustion chamber. Timing of the events involved in combustion and the properties of the resulting combustion affect the resulting efficiency and emissions of the engine. In diesel engines, chemical properties of diesel fuel can affect auto-ignition timing and therefore affect engine efficiency and emissions.

Diesel fuels are designated with a cetane number which indicates the ability of the diesel fuel to auto-ignite when injected into compressed air in a combustion chamber of a diesel engine. Cetane numbers affect a progression and an intensity of the resulting combustion. The higher the cetane number of the fuel, the more quickly auto-ignition occurs following an injection. Diesel fuels with lower cetane numbers have a greater ignition delay and thus slower auto-ignition. Similarly, given a fixed mass of fuel, the higher the cetane number of the fuel in a combustion event, the greater the magnitude of the energy release in the resulting combustion will be. Commercially available diesel fuels commonly have cetane numbers in a range of 40 to 55. Diesel fuel cetane numbers may vary each vehicle fill up, thereby varying an average cetane number of the diesel fuel stored in the vehicle fuel tank.

Pressure sensors in the combustion chambers have been used to determine combustion timing and phasing. Known methods for evaluating magnitude measured as signal power or for evaluating combustion phasing rely on estimating heat of combustion, the work performed by combustion, or other reactive metrics. These methods review historical data and react to trends or accumulated data points in the combustion data.

Diesel engines operating under compression ignition are sensitive to changes in fuel properties, as small variations in cylinder conditions can interfere with conditions necessary to create ignition at a desired point in the combustion cycle. Some diesel engines are known to utilize pre-mixed charge compression ignition (PCCI) combustion, wherein the charge is brought to a condition creating auto-ignition of substantially the entire charge at once, allowing improvements in efficiency, fuel economy, and low emissions. Changes in fuel properties affect auto-ignition utilized in PCCI and the properties of the resulting combustion, thereby affecting the benefits of efficiency, fuel economy, and low emissions. Similarly, it will be appreciated that low temperature combustion in a diesel engine is dependent upon properties of the fuel and the resulting combustion.

Compression-ignition engines and other engine control schemes operate over broad engine conditions. Fuel control, fuel tailoring, charge ignition timing control, and exhaust gas recirculation (EGR) control are used to meet operator demands for performance and fuel economy and comply with emissions requirements. Variability in combustion affects heat release and work output from individual cylinders, resulting in undesired performance of the engine.

SUMMARY

A method for controlling a diesel internal combustion engine includes monitoring pressure in a combustion chamber resulting from combustion of a fuel, determining a combustion parameter as a function of the monitored pressure, determining a cetane number of the fuel as a function of a predetermined correlation between the combustion parameter and the cetane number, and controlling the engine based upon the cetane number of the fuel.

BRIEF DESCRIPTION OF THE DRAWINGS

One or more embodiments will now be described, by way of example, with reference to the accompanying drawings, in which.

DETAILED DESCRIPTION

Figure 1:
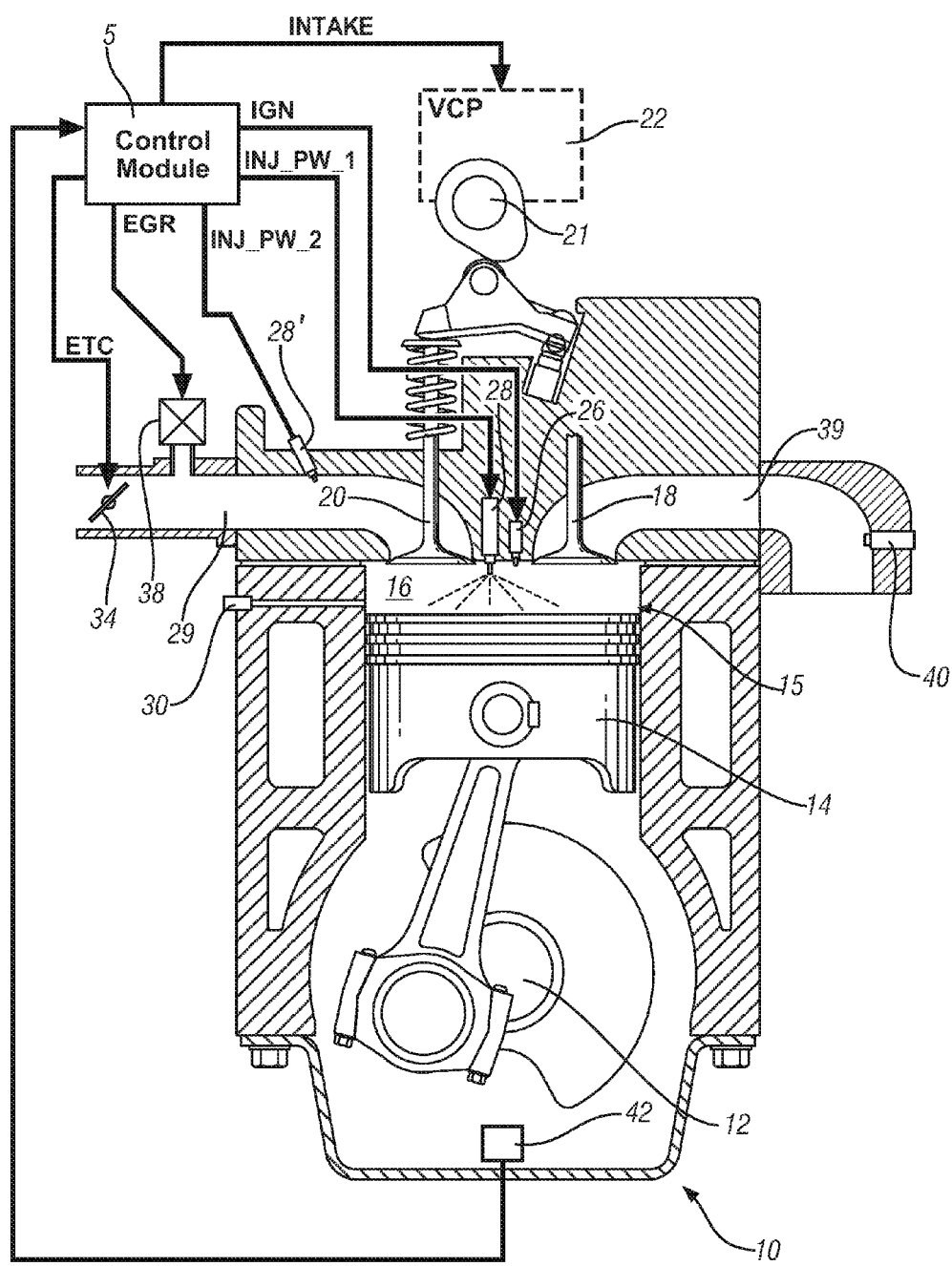
FIG. 1 is a schematic drawing of an exemplary engine system and aftertreatment system, in accordance with the present disclosure.

Referring now to the drawings, wherein the showings are for the purpose of illustrating certain exemplary embodiments only and not for the purpose of limiting the same, FIG. 1 schematically illustrates a single cylinder of a direct-injection spark-assisted compression-ignition engine 10 and an accompanying control module 5 that have been constructed in accordance with an embodiment of the disclosure. Those having ordinary skill in the art will recognize that the present disclosure may be applied to multi-cylinder engines. The engine 10 may operate in various combustion modes including a compression ignition combustion mode. The engine 10 can be selectively operative at various air/fuel ratios.

In one embodiment the engine 10 can be coupled to a transmission device to transmit tractive power to a driveline of a vehicle. The transmission can include a hybrid transmission including torque machines operative to transfer tractive power to a driveline.

The exemplary engine 10 is a direct-injection four-stroke internal combustion engine having reciprocating piston 14 slidably movable in a cylinder 15 which define a variable volume combustion chamber 16. The piston 14 is connected to a rotating crankshaft 12 by which linear reciprocating motion is translated to rotational motion. An air intake system provides intake air to an intake manifold 29 which directs and distributes air into an intake runner of the combustion chamber 16. The air intake system includes airflow ductwork and devices for monitoring and controlling the airflow. A throttle valve 34 preferably includes an electronically controlled device that is used to control airflow to the engine 10 in response to a control signal (ETC) from the control module 5. An external flow passage recirculates exhaust gases from an exhaust manifold 39 to the intake manifold 29, having a flow control valve referred to as an exhaust gas recirculation (EGR) valve 38. The control module 5 is configured to control mass flow of exhaust gas to the intake manifold 29 by controlling opening of the EGR valve 38.

Airflow from the intake manifold 29 into the combustion chamber 16 is controlled by one or more intake valve(s) 20. Exhaust flow out of the combustion chamber 16 is controlled by one or more exhaust valve(s) 18 to the exhaust manifold 39. The engine 10 is equipped with systems to control and adjust openings and closings of the intake and exhaust valves 20 and 18, respectively.

The engine 10 includes a fuel injection system, including one or more high-pressure fuel injectors 28 each configured to directly inject a mass of fuel into the combustion chamber 16 in response to a signal (INJ_PW) from the control module 5. The fuel injectors 28 are supplied pressurized fuel from a fuel distribution system. In one embodiment, a second fuel injector 28' may be included in the intake manifold 29 and configured to inject fuel into the intake manifold 29 thereby increasing premixing of injected fuel and intake air charge.

In one embodiment, the engine 10 includes a spark-ignition system by which spark energy can be provided to a spark discharge device 26 for igniting or assisting in igniting cylinder charges in the combustion chamber 16 in response to a signal (IGN) from the control module 5. One having ordinary skill in the art will recognize that the spark discharge device 26 may be a spark plug, glow plug, or other igniter device configured to induce combustion.

The engine 10 is equipped with various sensing devices for monitoring engine operation, including a crank sensor 42 having output RPM and operative to monitor crankshaft rotational position, i.e., crank angle and speed, in one embodiment a combustion sensor 30 configured to monitor combustion, and an exhaust gas sensor 40 configured to monitor exhaust gases, typically an air/fuel ratio sensor. The combustion sensor 30 includes a sensor device operative to monitor a state of a combustion parameter and is depicted as a cylinder pressure sensor operative to monitor in-cylinder combustion pressure. The output of the combustion sensor 30 and the crank sensor 42 are monitored by the control module 5 which determines combustion phasing, i.e., timing of combustion pressure relative to the crank angle of the crankshaft 12 for the cylinder 15 for each combustion cycle. The combustion sensor 30 can also be monitored by the control module 5 to determine a mean effective pressure, e.g., IMEP, for each cylinder 15 for each combustion cycle. Preferably, the engine 10 and control module 5 are mechanized to monitor and determine states of IMEP for each of the engine cylinders 15 during each cylinder firing event. Alternatively, other sensing systems can be used to monitor states of other combustion parameters within the scope of the disclosure, e.g., ion-sense ignition systems, and non-intrusive cylinder pressure sensors.

Control module, module, controller, processor and similar terms mean any suitable one or various combinations of one or more of Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs, combinational logic circuit(s), input/output circuit(s) and devices, appropriate signal conditioning and buffer circuitry, and other suitable components to provide the described functionality. The control module has a set of control algorithms, including resident software program instructions and calibrations stored in memory and executed to provide the desired functions. The algorithms are preferably executed during preset loop cycles. Algorithms are executed, such as by a central processing unit, and are operable to monitor inputs from sensing devices and other networked control modules, and execute control and diagnostic routines to control operation of actuators. Loop cycles may be executed at regular intervals, for example each 3.125, 6.25, 12.5, 25 and 100 milliseconds during ongoing engine and vehicle operation. Alternatively, algorithms may be executed in response to occurrence of an event.

In operation, the control module 5 monitors inputs from the aforementioned sensors to determine states of engine parameters. The control module 5 is configured to receive input signals from an operator (e.g., via a throttle pedal and a brake pedal) to determine an operator torque request the control module 5 monitors the sensors indicating the engine speed and intake air temperature, and coolant temperature and other ambient conditions.

The control module 5 executes algorithmic code stored therein to control the aforementioned actuators to form the cylinder charge, including controlling throttle position, spark-ignition timing, fuel injection mass and timing, EGR valve position to control flow of recirculated exhaust gases, and intake and/or exhaust valve timing and phasing on engines so equipped. Valve timing and phasing can include negative valve overlap (NVO) and lift of exhaust valve reopening (in an exhaust re-breathing strategy) in one embodiment. The control module 5 can operate to turn the engine 10 on and off during ongoing vehicle operation, and in multi-cylinder engines can operate to selectively deactivate a portion of the combustion chambers 16 or a portion of the intake and exhaust valves 20 and 18 through control of fuel and spark and valve deactivation. The control module 5 can control air/fuel ratio based upon feedback from the exhaust gas sensor 40.

In the exemplary engine 10, the control module 5 commands fuel injection pulses from the fuel injector 28 in each combustion cycle for each combustion chamber 16. In one embodiment, the control module 5 commands a pilot pulse and a main pulse during each combustion cycle. The pilot pulse includes an initial mass of fuel injected to initiate combustion. The main pulse provides power to drive torque generated by the engine 10. The fuel quantity of the main pulse is selected by the control module 5, based on the operator input. When the control module 5 modifies the SOI angle, the control module 5 also modifies a corresponding crank angle at which the pilot pulse is injected. The control module 5 monitors input signals from an operator, for example, through a position of a pedal to determine an operator torque request.

Figure 2:
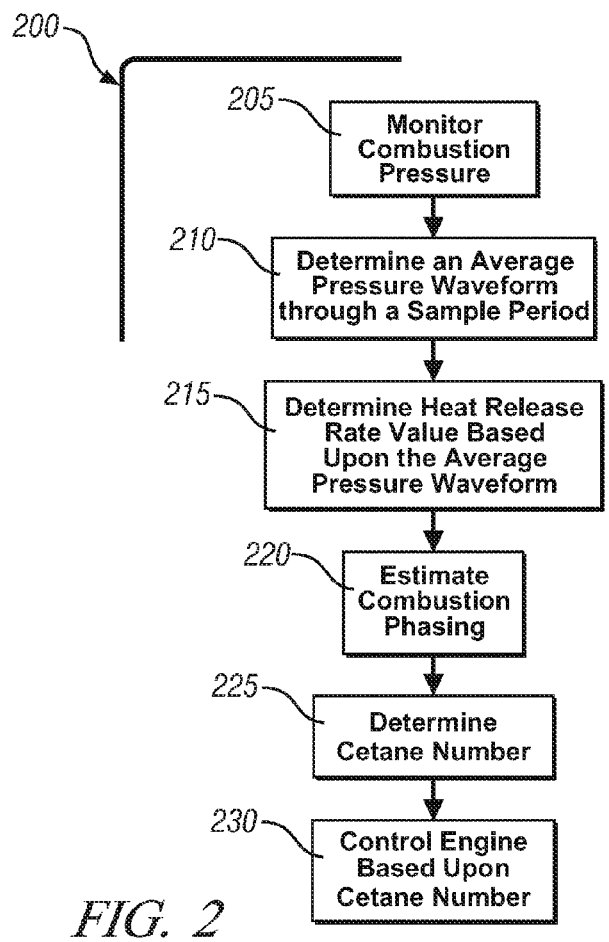
FIG. 2 is a control scheme for determining a cetane number, in accordance with the present disclosure.

With reference to FIGS. 1-4, combustion pressure sensor 30 is monitored determining the heat release rate during combustion, estimating combustion phasing, and determining the cetane number based upon the estimated combustion phasing. FIG. 2 is a control scheme 200 for determining a cetane number of the diesel fuel combusted in the combustion chamber 16. The control scheme 200 is illustrated in FIG. 2, and described herein as including discrete elements. Such illustration is for ease of description and it should be recognized that the functions performed by these elements may be combined in one or more devices, e.g., implemented in software, hardware, and/or application-specific integrated circuitry. For example, the control scheme 200 may be executed as one or more algorithms in the control module 5. The control scheme 200 includes monitoring pressure in the combustion chamber 16 using the combustion pressure sensor 30 (205). As will be appreciated, combustion pressure waveforms monitored through the sensors can include signal noise. Accurate cetane estimation requires that the noise from the pressure waveforms be filtered. Scheme 200 exhibits an exemplary method to filter the monitored pressures, determining an average pressure waveform through a sample period (210). It will be appreciated that a great number of filtering methods are known in the art, and many of these methods could be equally substituted to reduce or remove noise from the monitored pressure signal. Based upon the average pressure waveform, heat release values corresponding to the cylinder pressure values can be determined (215). These heat release values are descriptive of the progression of combustion within the combustion chamber, and evaluation of the combustion can be utilized to describe properties of the fuel used in the combustion. Control module 5 estimates combustion phasing based upon the heat release values (220), and determines the cetane number based upon the estimated combustion phasing (225). Determining cetane number based upon the estimated combustion phasing can be accomplished by a number of methods according to the present disclosure. The control module 5 controls engine operation based upon the cetane number according to methods described herein (230).

The control module 5 determines the heat release rate of a combustion charge as a function of engine crank angle during combustion based upon pressure in the combustion chamber 16. The heat release rates of the combustion charge may be determined for a predetermined range of engine crank angles within a larger combustion cycle, e.g., limited to a range of engine crank angles encompassing the pilot fuel injection. Pressure is monitored by the combustion pressure sensor 30 and input to the control module 5 as described hereinabove. Crank angle is monitored by the crank sensor 42 and input to the control module 5 as described hereinabove. In one embodiment, the control module 5 may determine the heat release rate of the pilot fuel injection using the monitored pressure measurements corresponding to the pilot fuel injection. The heat release rate h(t) of the combustion charge may be determined using the following equation.

$$h(t) = \frac{dQ_{ch}}{d\theta} = \frac{\gamma}{\gamma-1}p\frac{dV}{d\theta} + \frac{1}{\gamma-1}V\frac{dp}{d\theta} \quad [1]$$

The variable p represents cylinder pressure monitored using the combustion pressure sensor 30, V represents the volume of the combustion chamber 16, θ represents crank angle, γ represents a ratio of specific heat, and $Q_{ch}$ represents gross heat release. Gamma, γ, includes a ratio of specific heats and may be predetermined as that for air at the temperature corresponding to those used for computing the signal bias and without EGR. Thus, nominally or initially γ=1.365 for diesel engines and nominally γ=1.30 for gasoline engines. These can however be adjusted based upon the data from the specific heats for air and stoichiometric products using an estimate of the equivalence ratio, φ, and EGR molar fraction targeted for the operating condition or for the changing properties of the charge within the combustion chamber through the combustion cycle.

According to different embodiments, the predetermined range of engine crank angles can be selected to encompass the pilot fuel injection, the subsequent main combustion, or both. The period through which the pressure signal is filtered to determine an average or filtered signal to be utilized can vary based upon computational efficiency, required accuracy in the output, and availability of information with the system at steady state.

Figure 3:
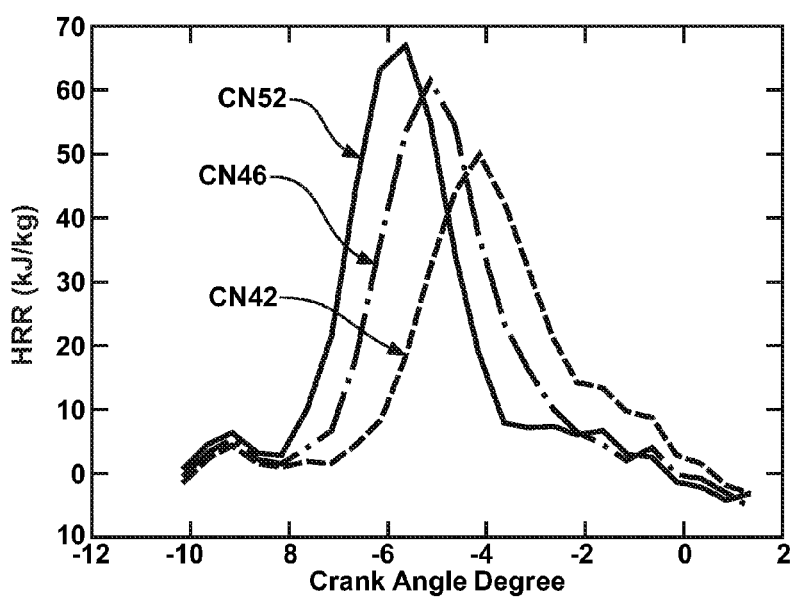
FIG. 3 graphically illustrates heat release rates of exemplary diesel fuels having various cetane numbers over a period of engine crank angles, in accordance with the present disclosure.

FIG. 3 graphically illustrates heat release rates of exemplary diesel fuels having various cetane numbers over a period of engine crank angles. The heat release rates are depicted over a range of engine crank angles encompassing a pilot fuel injection and combustion. The diesel fuel was injected in equal quantities at −15 degrees aTDC engine crank angle for each of the exemplary diesel fuels. As FIG. 3 shows, higher cetane number diesel fuels have greater heat release rates over the pilot combustion event. Additionally, FIG. 3 shows that the higher the cetane number, the earlier the peak in heat release rate occurs in the combustion cycle.

After determining heat release rates, the control module 5 of the exemplary scheme 200 estimates combustion phasing (220). Combustion phasing may be estimated using any of several known methods to estimate phase or magnitude of a signal. One known method includes analyzing the heat release rate of the pilot fuel injection using a Fast Fourier Transforms (FFTs). The FFT filters noisy data into useful information. One FFT method known as spectrum analysis analyzes a complex signal and separates the signal into its component parts which may be represented as a sum of harmonics. FFTs and spectrum analysis are known in the art and will not be described in detail herein.

FFTs provide information regarding the magnitude and phase of each identified harmonic. Experimental analysis has shown that combustion phasing is described by the first or fundamental harmonic. By identifying this first harmonic, the combustion phasing can be measured and evaluated. The fundamental frequency component may be represented as follows:

$$\phi = \arctan\left(\frac{\sum_{n=0}^{N-1} b_n h(n+1)}{\sum_{n=0}^{N-1} a_n h(n+1)}\right) \quad [2]$$

wherein h(n+1), n equaling 1, 2, 3 ... N, represents a periodic input for the estimated heat release rate and $a_n$ and $b_n$ are decomposed FFT components and can be represented as follows.

$$a_n = \cos\left(\frac{2\pi n}{N}\right) \quad [3]$$

$$b_n = -\sin\left(\frac{2\pi n}{N}\right) \quad [4]$$

It will be appreciated that $a_n$ and $b_n$ can be determined offline, saved in memory, and referenced for real-time calculations.

Signals analyzed through FFTs are most efficiently estimated when the input signal is at steady state. Transient effects of a changing input signal can create errors in the estimations performed. While methods are known to compensate for the effects of transient input signals, the methods disclosed herein are preferably performed at either idle or steady, average engine speed conditions in which the effects of transients are substantially eliminated. One known method to accomplish the test in an acceptably steady test period is to take samples at a test interval and utilize an algorithm within the control module 5 to either validate or disqualify the test data as being taken during a steady period of engine operation.

After estimating combustion phasing, the control module 5 determines the cetane number of the diesel fuel combusted in the combustion chamber 16 (225). According to one exemplary embodiment, experimental testing estimates a correlation between combustion phasing and cetane number. However, it will be appreciated that the correlation can be determined according to calculation, modeling, or any method sufficient to estimate the effects of cetane number on combustion properties. Further, it will be appreciated that the correlation between combustion phasing and cetane number is experimentally determined for particular engine characteristics and the particular hardware application, and changes to engine characteristics or factors affecting engine characteristics in addition to cetane number must be accounted for in the correlation. For example, spray formation, fuel delivery amount, and evaporation are known to affect combustion rates. In one embodiment, a lookup table in memory of the control module 5 is populated with the combustion phasing values and corresponding cetane numbers using the experimentally determined correlation between combustion phasing values and cetane numbers. In operation, the control module 5 locates the estimated combustion phasing value in the lookup table and locates a corresponding cetane number.

Figure 4:
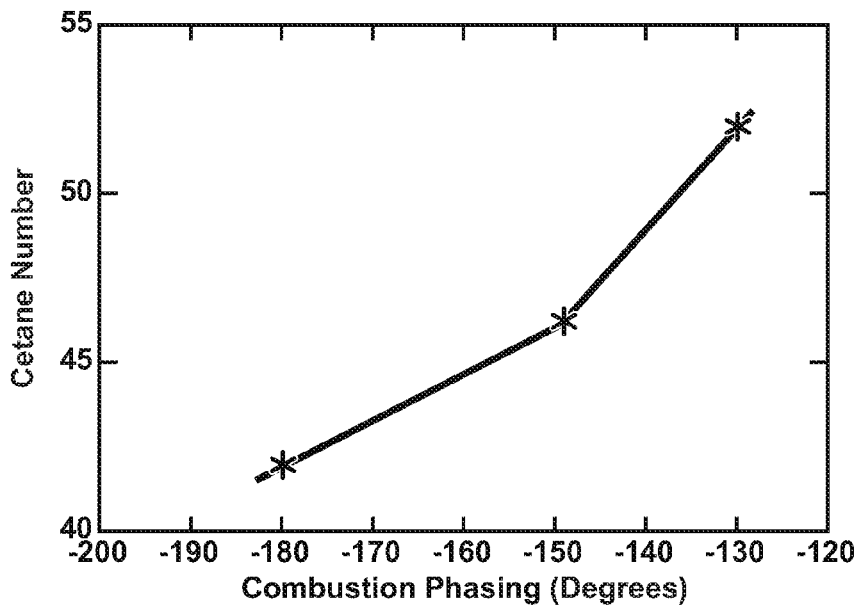
FIG. 4 graphically illustrates cetane number as a function of combustion phasing for the exemplary engine system, in accordance with the present disclosure.

FIG. 4 graphically illustrates cetane number as a function of combustion phasing for an exemplary engine system such as the one described with reference to FIG. 1. Such a function or correlation can be populated according to the methods described above. As FIG. 4 shows, combustion phasing is substantially linearly related to cetane number in particular ranges of combustion phasing. For example, FIG. 4 shows a combustion phasing value of −180 degrees corresponds to a cetane number of 42, and a combustion phasing value of −148 corresponds to a cetane number of 46.

The data of FIG. 3 and the included method describes use of data collected during a pilot injection and combustion period. It will be appreciated that the methods described herein can be utilized in this way to diagnose the fuel mixture properties based upon the pilot combustion period or similarly based upon the main combustion period.

Figure 5:
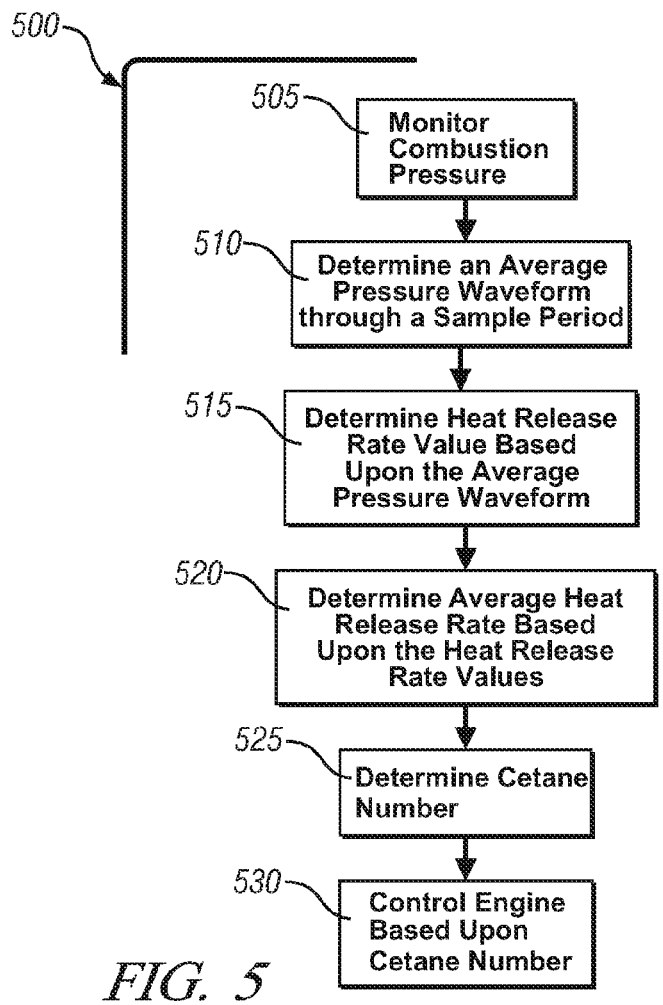
FIG. 5 is an additional control scheme for determining a cetane number, in accordance with the present disclosure.

The cetane number may be determined based upon an average heat release rate for a predetermined duration of a combustion cycle and is described with reference to FIG. 1 and FIGS. 5-6. FIG. 5 is a control scheme 500 used for implementing the second method. The control scheme 500 is illustrated in FIG. 5, and described herein as including discrete elements. Such illustration is for ease of description and it should be recognized that the functions performed by these elements may be combined in one or more devices, e.g., implemented in software, hardware, and/or application-specific integrated circuitry. For example, the control scheme 500 may be executed as one or more algorithms in the control module 5. The control scheme 500 includes monitoring pressure in the combustion chamber 16 using the combustion pressure sensor 30 as described hereinabove (505). An average pressure waveform is determined through a sample period (510), as described above, as an exemplary method to filter noise from the pressure signal. Based upon the average pressure waveform, heat release values corresponding to the cylinder pressure values can be determined (515). The control module 5 determines a value of an average heat release rate for the predetermined duration of the combustion cycle based upon the average pressure waveform (520). The control module 5 determines the cetane number based upon the average heat release rate (525). The control module 5 controls engine operation based upon the cetane number (530).

The control module 5 determines an average heat release rate for the predetermined duration of a combustion cycle (520) based upon the heat release rate determined using Equation 1 described herein above. An exemplary average heat release rate over a range of engine crank angles encompassing a pilot fuel injection may be determined. The average heat release rate, P, may be determined using the following equation:

$$P = \frac{1}{N} \sum_{n=1}^{N-1} h(n+1) \quad [5]$$

wherein n and N define the duration of a combustion cycle used to determine the average heat release rate.

After the average heat release rate of the pilot fuel injections is determined, the control module 5 determines the cetane number based upon the average heat release rate of the pilot fuel injections (525). In one exemplary embodiment, experimental testing is used to estimate a correlation between the average heat release rate of the pilot fuel injections and cetane number. As described above with relation to combustion phasing, it will be appreciated that the correlation between the average heat release rate of the pilot fuel injections and cetane number can be determined according to experimentation, calculation, modeling, or any method sufficient to estimate the effects of cetane number on combustion properties. The correlation between the average heat release rate of the pilot fuel injections and cetane number is experimentally determined for particular engine characteristics and the particular hardware application. In operation, the average heat release rate of the pilot fuel injections is correlated to a cetane number based upon the estimated correlation between the average heat release rate of the pilot fuel injections and cetane number. In one embodiment, a lookup table in memory of the control module 5 is populated with the average heat release rate values and corresponding cetane numbers using the experimentally determined correlation between the average heat release rate values and cetane numbers. The control module 5 locates the average heat release rate value determined as described herein above and selects a corresponding cetane number stored in the lookup table.

Figure 6:
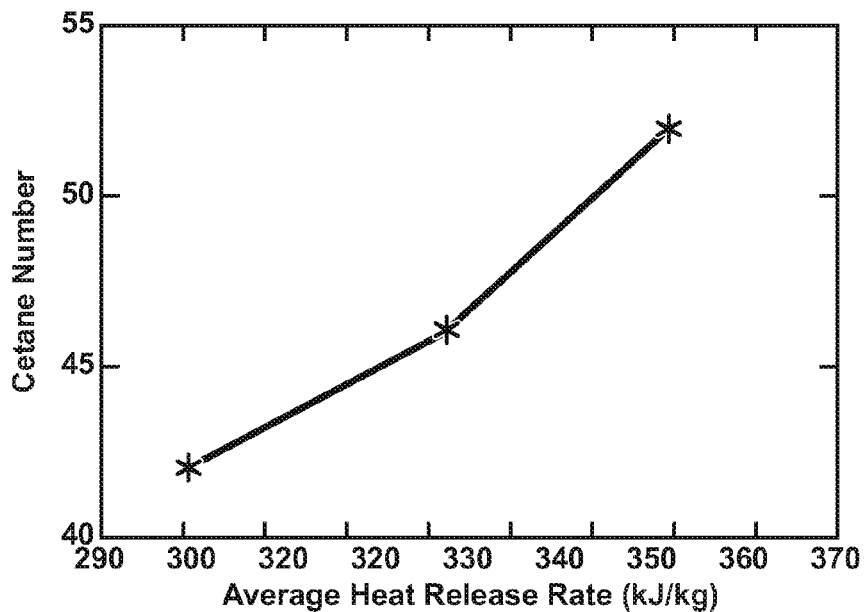
FIG. 6 graphically illustrates cetane number as a function of the average heat release rate for the exemplary engine system, in accordance with the present disclosure.

FIG. 6 graphically illustrates cetane number as a function of the average heat release rate for an exemplary engine system such as the one described with reference to FIG. 1. As FIG. 6 illustrates, the average heat release rate is substantially linearly related to cetane number in particular ranges of average heat release rates. For example, as FIG. 6 shows, an average heat release rate of 301 kJ/kg corresponds to a cetane number of 42 and an average heat release rate of 334 kJ/kg corresponds to a cetane number of 46.

Figure 7:
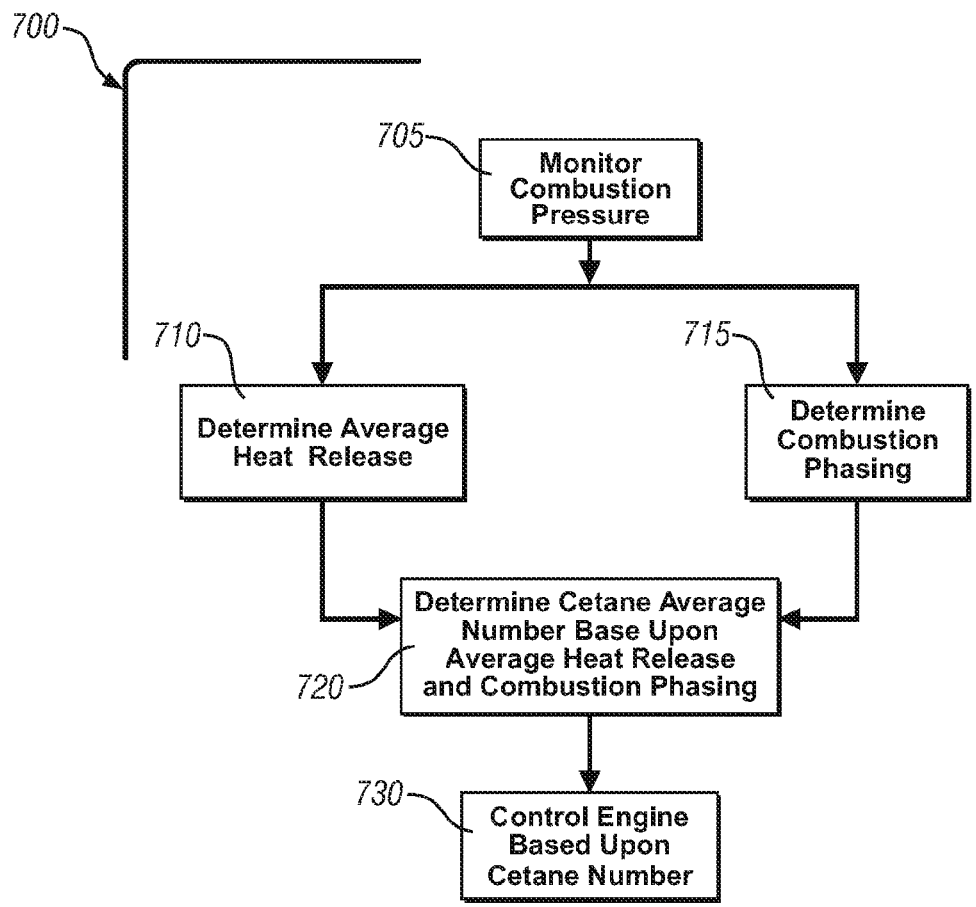
FIG. 7 is an additional control scheme for determining a cetane number, in accordance with the present disclosure.

Another method for determining the cetane number is described with reference to FIG. 1 and FIGS. 7-8. FIG. 7 is a control scheme 700 used for implementing the third method. The methods described above disclose methods for determining cetane number according to combustion phasing and average heat release rate. It will be appreciated that a method employing both combustion phasing and average heat release rate can be utilized to determine cetane number. The control scheme 700 is illustrated in FIG. 7, and described herein as including discrete elements. Such illustration is for ease of description and it should be recognized that the functions performed by these elements may be combined in one or more devices, e.g., implemented in software, hardware, and/or application-specific integrated circuitry. For example, the control scheme 700 may be executed as one or more algorithms in the control module 5. The control scheme 700 includes monitoring pressure in the combustion chamber 16 using the combustion pressure sensor 30 as described hereinabove (705). Methods described herein can be employed to determine an average heat release rate based upon the monitored combustion pressure (710). Similarly, methods described herein can be employed to determine a combustion phasing value (715). Based upon the determined average heat release rate and combustion phasing values, a cetane number can be estimated (720). The control module 5 can control engine operation based upon the cetane number (730).

After determining the average heat release rate and the combustion phasing value, the control module 5 determines the cetane number (720). A correlation exists between combustion phasing and the cetane number and a correlation exists between the average heat release rate and the cetane number. Using the correlation between combustion phasing and the cetane number a range of combustion phasing values corresponding to a particular cetane number, e.g. 46, may be established for a particular hardware application. Additionally, using the correlation between the average heat release rate and the cetane number a range of average heat release rates corresponding to a particular cetane number, e.g. 46, may be established for a particular hardware application. Plotting combustion phasing estimate values and corresponding cetane numbers against average heat release rates and corresponding cetane numbers, zones or clusters of values corresponding to the cetane numbers can be defined wherein estimations of cetane numbers can be made with increased confidence. Preferably, there are multiple predefined zones corresponding to accepted ranges of combustion phasing values and average heat release rates for different cetane numbers.

In operation, the predefined zones including the points of combustion phasing values and average heat release rates are stored in lookup tables in memory of the control module 5 for retrieval during engine operation. The control module 5 locates the combustion phasing value and the average heat release rate in the lookup tables. If the combustion phasing value and the average heat release rate are within the zone, then the control module 5 locates the corresponding cetane number.

Figure 8:
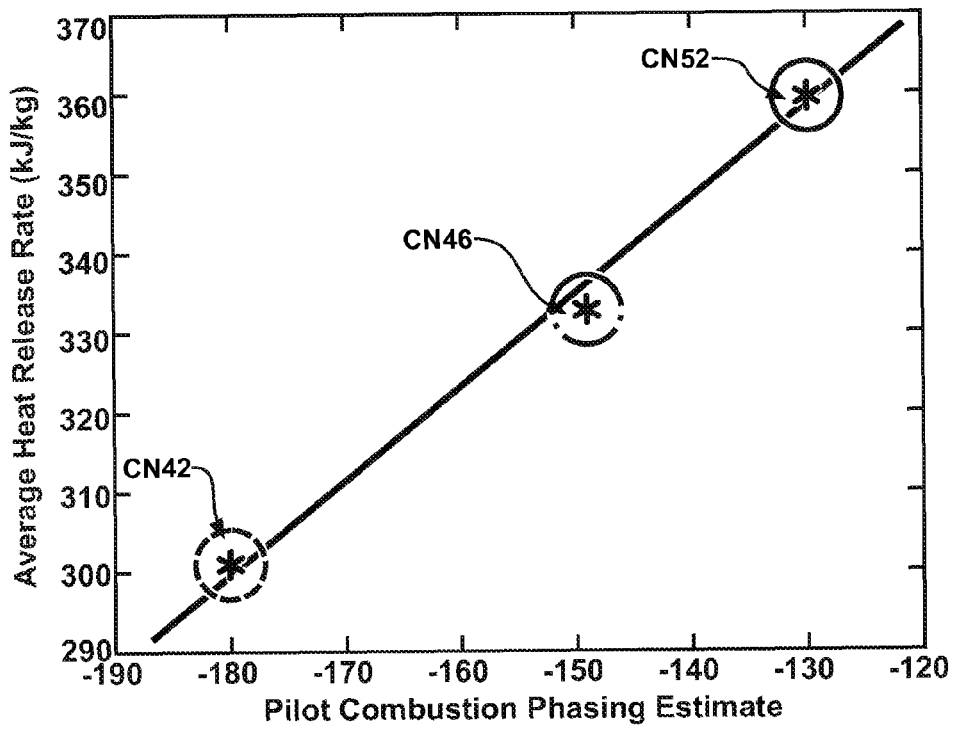
FIG. 8 graphically illustrates three exemplary predefined zones corresponding to cetane numbers for the exemplary engine system, in accordance with the present disclosure.

FIG. 8 graphically illustrates three exemplary predefined zones corresponding to cetane numbers for an exemplary engine system such as the one described with reference to FIG. 1. An exemplary cetane number of 42 is depicted, corresponding to a combustion phasing value range of approximately −183 to −177 degrees and an average heat release rate range of 297 kJ/kg to 305 kJ/kg. The defined ranges are depicted as resulting circular zones, wherein values of combustion phasing and average heat release rate can be utilized to estimate the corresponding cetane number. Similar cetane numbers 46 and 52 and corresponding ranges are depicted similarly as resulting zones. As FIG. 8 shows, the predefined zones defined by ranges of combustion phasing values and average heat release rates may be circular, although other configurations are possible and within contemplation of the disclosure.

After determining the cetane number, the control module 5 controls engine operation based upon the cetane number (230, 530, and 730). As described herein above, higher cetane numbers correspond to an advancing auto-ignition, while lower cetane numbers have a slower auto-ignition. Effects of the estimated cetane number can be estimated according to impacts to efficiency, fuel economy, emissions, and other combustion properties. Injection timing, injection quantity, fuel rail pressure, EGR, and throttle position may be adjusted to compensate based upon the cetane number. Certain combustion properties can be prioritized, for example, with certain cetane numbers resulting in adjustments to maintain minimum emissions requirements.

The above methods describe pressure measurements being utilized to describe heat release rates useful to describe the combustion occurring within the combustion chamber. However, it will be appreciated that pressure measurements can be used through other analyses to describe the combustion occurring within the combustion chamber. For example, pressure measurements can be utilized to describe a pressure ratio difference between a measured pressure and a calculated motored pressure, estimating a pressure value if no combustion took place in the cylinder, at a given crank angle ($p_{MOT}(\theta)$). Pressure ratio (PR) can be described according to the following equation.

$$PR(\theta) = \frac{p(\theta)}{p_{MOT}(\theta)} \quad [6]$$

PR can be analyzed, for example, according to spectral analysis described above, to describe either combustion phasing or combustion magnitude, the equivalent of the average heat release rate utilized in the methods described above. For example, pressure ratios can be utilized to describe a combustion parameter, such as phase or magnitude of the combustion, that can be calibrated to experimental or predicted cetane numbers, similarly to the methods described above in relation to FIGS. 4 and 6. In one exemplary embodiment, an FFT of the pressure ratio could be utilized to describe the combustion parameter. Other analyzes based upon in-cylinder pressure measurements to quantify combustion parameters useful to estimate a cetane number are envisioned, and the disclosure is not intended to be limited to the particular exemplary embodiments described herein.

Figure 9:
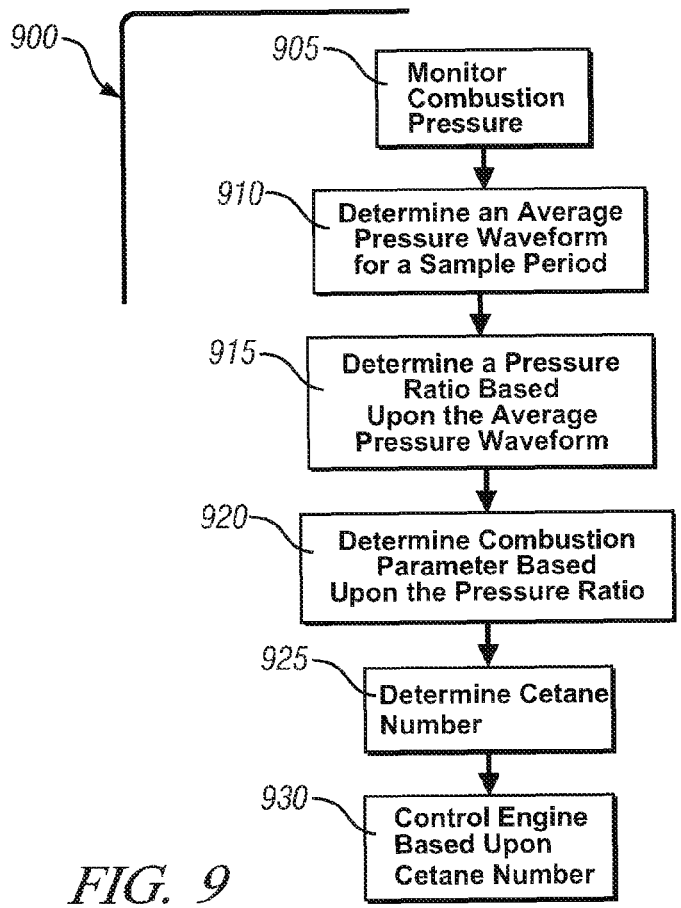
FIG. 9 is an additional control scheme for determining a cetane number, in accordance with the present disclosure.

A scheme to determine cetane number based upon pressure ratio is depicted in FIG. 9, in accordance with the present disclosure. Scheme 900 begins by monitoring a combustion pressure (905). Through a number of cycles, as described above as an exemplary method to filter out noise from the signal, an average pressure waveform is determined through a sample period based upon the monitored combustion pressures (910). Based upon the average pressure waveform, a pressure ratio can be determined at different points through the average pressure waveform (915). As described above, a pressure ratio can be utilized to describe a combustion parameter describing a phase or magnitude of the combustion occurring within the combustion chamber. Such a combustion parameter is determined based upon the pressure ratio (920). A cetane number can be determined based upon the combustion parameter (925). The engine can be controlled based upon the cetane number (930).

As described above, cetane number can change as new fuel is put in the fuel tank. A tank that was previously filled with fuel with a cetane number of 52 but is only a quarter full can be refilled with fuel with a cetane number of 42. The resulting fuel mixture will have a resulting cetane number closer to 42 than to 52. It will be appreciated that the above methods can be indicated to be performed when the fuel level sensor of the vehicle detects that the fuel tank has been refilled. However, it will also be appreciated that immediately following the refueling event, the fuel tank might not be adequately mixed, such that a sample from the tank might not reflect the average mixture of the tank. Further, it will be appreciated that some amount of the fuel mixture before the refueling event remains in the fuel lines, the fuel rail, and other portions of the fuel delivery system, such that a sample of the fuel within that system might not reflect the mixture in the fuel tank immediately following the refueling event. For these reasons, it can be beneficial to perform the above methods to estimate cetane number after the vehicle has operated for some period. This period can be a calibrated period based upon any method sufficient to evaluate the period of operation necessary to get accurate readings based upon the current fuel mixture. Additionally, it will be appreciated that under some conditions, factors such as condensation in the fuel tank and evaporation of components of the fuel mixture can change the properties of the fuel mixture in the fuel tank. It can be beneficial to run the above methods to estimate cetane number periodically or after some period of operation to correct the estimated cetane number for any change to the fuel mixture. Other factors may affect cetane number or the continued validity of an estimated cetane number, and the disclosure is not intended to be limited to the particular embodiments describing reasons to schedule or perform the methods described herein.

It will be appreciated that the above methods describe estimating a cetane number based upon a correlation of combustion properties to cetane number. Examples are described above, wherein a round cetane number is determined (e.g. 42, 46, 52). It will be appreciated that the estimated cetane number can be determined to a decimal place or decimal places. Such number can be rounded or resulting determinations of the fuel properties or required engine commands can be interpolated.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. Method for controlling a diesel internal combustion engine, the method comprising:
monitoring pressure in a combustion chamber resulting from combustion of a fuel;
determining a combustion parameter as a function of the monitored pressure over a predetermined range of crank angles within a combustion cycle, the predetermined range of crank angles selected to encompass at least one of a range of crank angles associated with a pilot fuel injection and a range of crank angles associated with a main fuel injection;
determining a cetane number of the fuel over the predetermined range as a function of a predetermined correlation between the combustion parameter and the cetane number; and
controlling the engine based upon the cetane number of the fuel.

2. The method of claim 1, wherein determining the combustion parameter comprises:
determining an average heat release rate over a predetermined duration; and
wherein determining the cetane number of the fuel comprises determining the cetane number of the fuel as a function of a predetermined correlation between the average heat release rate and the cetane number.

3. The method of claim 1, wherein determining the combustion parameter comprises:
determining a heat release rate;
estimating a combustion phasing as a function of the heat release rate; and
wherein determining the cetane number of the fuel comprises determining the cetane number of the fuel as a function of a predetermined correlation between the combustion phasing and the cetane number.

4. The method of claim 1, wherein determining the combustion parameter comprises determining a combustion phasing; and
wherein determining the cetane number of the fuel comprises determining the cetane number of the fuel as a function of a predetermined correlation between the combustion phasing and the cetane number.

5. The method of claim 1, wherein determining combustion parameter comprises determining a pressure ratio; and
wherein determining the cetane number of the fuel comprises determining the cetane number of the fuel as a function of a predetermined correlation between the pressure ratio and the cetane number.

6. The method of claim 1, wherein the controlling the engine based upon the estimated cetane number of the fuel comprises controlling an engine parameter selected from the group consisting of a fuel injection timing, a fuel injection quantity, a fuel rail pressure, an exhaust gas recirculation, and a throttle position.

7. The method of claim 1, further comprising:
monitoring a fuel level in a fuel tank;
determining a refueling event based upon the monitored fuel level; and
wherein determining the cetane number of the fuel is performed in response to the refueling event.

8. System for controlling a diesel internal combustion engine, the system comprising:
a pressure sensor monitoring pressure in a combustion chamber resulting from combustion of a fuel; and
a control module:
determining heat release rates of a combustion cycle based upon the monitored pressure over a predetermined range of crank angles within a combustion cycle, the predetermined range of crank angles selected to encompass at least one of a range of crank angles associated with a pilot fuel injection and a range of crank angles associated with a main fuel injection;
estimating combustion phasing as a function of the heat release rates;
determining a cetane number of the fuel over the predetermined range as a function of a predetermined correlation between the combustion phasing and the cetane number; and
controlling the engine based upon the cetane number of the fuel.

9. The system of claim 8, further comprising the control module filtering noise from the pressure sensor including determining an average pressure waveform.

10. The system of claim 8, wherein estimating combustion phasing as a function of the heat release rates comprises analyzing the heat release rates using a fast Fourier transform.

11. The system of claim 10, wherein the combustion phasing is identified as a lowest frequency harmonic of the fast Fourier transform.

12. The system of claim 8, wherein determining the cetane number of the fuel comprises referencing a predetermined correlation between the combustion phasing and the cetane number.

13. Method for controlling a diesel internal combustion engine, the method comprising:
- monitoring pressure in a combustion chamber resulting from combustion of a fuel;
- determining a combustion parameter as a function of the monitored pressure comprising
  - determining a heat release rate,
  - estimating a combustion phasing as a function of the heat release rate,
  - determining an average heat release rate over a predetermined duration, and
  - wherein determining the cetane number of the fuel comprises comparing the average heat release rate and the combustion phasing to predetermined associations of cetane numbers with respective ranges of average heat release rate and combustion phasing, and when the average heat release rate and the combustion phasing both fall within respective ranges associated with a common cetane number, determining the cetane number of the fuel as the common cetane number;
- determining a cetane number of the fuel as a function of a predetermined correlation between the combustion parameter and the cetane number; and
- controlling the engine based upon the cetane number of the fuel.

14. Method for controlling a diesel internal combustion engine, the method comprising:
- monitoring pressure in a combustion chamber resulting from combustion of a fuel;
- determining a fundamental frequency component of the monitored pressure utilizing a fast Fourier transformation of the monitored pressure;
- determining a cetane number of the fuel as a function of a predetermined correlation between fundamental frequency component of the monitored pressure and the cetane number; and
- controlling the engine based upon the cetane number of the fuel.

15. System for controlling a diesel internal combustion engine, the system comprising:
- a pressure sensor monitoring pressure in a combustion chamber resulting from combustion of a fuel; and
- a control module:
  - determining heat release rates over a predetermined range of crank angles within a combustion cycle, the predetermined range of crank angles selected to encompass at least one of a range of crank angles associated with a pilot fuel injection and a range of crank angles associated with a main fuel injection based upon the monitored pressure;
  - determining an average heat release rate for the predetermined range through a period;
  - determining a cetane number of the fuel over the predetermined range as a function of a predetermined correlation between the average heat release rate and the cetane number; and
  - controlling the engine based upon the cetane number of the fuel.

* * * * *